United States Patent [19]
Canini et al.

[11] Patent Number: 6,002,193
[45] Date of Patent: Dec. 14, 1999

[54] BASIC MODULE FOR A DISCOIDAL ELECTRIC MACHINE, AND CORRESPONDING ELECTRIC MACHINE

[75] Inventors: Jean-Marc Canini, Cousolre; Raymond Michaux, Solre-Le-Chateau; Yves Milet, Assevent, all of France

[73] Assignee: Jeumont Industrie, Courbevoie, France

[21] Appl. No.: 09/091,469

[22] PCT Filed: Dec. 23, 1996

[86] PCT No.: PCT/FR96/02071

§ 371 Date: Sep. 11, 1998

§ 102(e) Date: Sep. 11, 1998

[87] PCT Pub. No.: WO97/23939

PCT Pub. Date: Jul. 3, 1997

[30] Foreign Application Priority Data

Dec. 21, 1995 [FR] France ................................... 95 15304

[51] Int. Cl.⁶ ..................................................... H02K 1/22
[52] U.S. Cl. ............................ 310/268; 310/89; 310/112; 310/101; 310/105; 310/208; 310/234
[58] Field of Search .................................. 310/112, 268, 310/89, 103, 101, 208, 234

[56] References Cited

U.S. PATENT DOCUMENTS

| | | | |
|---|---|---|---|
| 4,514,653 | 4/1985 | Batni | 310/178 |
| 4,841,189 | 6/1989 | Cooper et al. | 310/257 |
| 4,866,321 | 9/1989 | Blanchard et al. | 310/112 |
| 4,874,974 | 10/1989 | Wu | 310/112 |
| 4,996,457 | 2/1991 | Hawsey et al. | 310/268 |
| 5,057,726 | 10/1991 | Mole et al. | 310/67 R |
| 5,068,554 | 11/1991 | Mohn | 310/12 |
| 5,216,339 | 6/1993 | Skybyk | 318/254 |
| 5,229,677 | 7/1993 | Dade et al. | 310/268 |
| 5,365,137 | 11/1994 | Richardson et al. | 310/258 |

FOREIGN PATENT DOCUMENTS

| | | |
|---|---|---|
| 0091125 | 10/1983 | European Pat. Off. |
| 2583231 | 12/1986 | France |
| 9422204 | 9/1994 | WIPO |

Primary Examiner—Nestor Ramirez
Assistant Examiner—Thanh Lam
Attorney, Agent, or Firm—Leydig, Voit & Mayer, Ltd.

[57] ABSTRACT

The present invention includes a basic module for a discoidal machine. The module includes at least one stator subassembly and a rotor subassembly. A housing member is connected to the stator subassembly. The stator subassembly and the rotor subassembly are coaxially arranged. A discoidal machine for such modules is also disclosed.

14 Claims, 5 Drawing Sheets

BASIC MODULE FOR A DISCOIDAL ELECTRIC MACHINE, AND CORRESPONDING ELECTRIC MACHINE

TECHNICAL FIELD

The present invention relates to the field of electric machines with a discoidal structure.

BACKGROUND OF THE INVENTION

These machines may be synchronous, asynchronous or with direct current. They are operating as a generator or as a motor. In a general manner, they consist of at least one rotor disc and one stator disc.

Such a machine conventionally comprises at least one disc-shaped stator held on a casing and the central portion of which is hollowed out as well as a rotor also in the shape of a disc, mounted onto a shaft the axis of rotation of which coincides with the axis of the stator disc. However, the arrangement of the rotor disc with respect to the stator disc may differ from one discoidal machine to another one.

Thus the patent FR-2,583,231 describes a discoidal machine comprising a rotor disc mounted for rotation on the shaft of the machine and a stator disc connected to the casing and centred onto the axis of the shaft. It also describes a discoidal machine in which a rotor disc is placed between two stator discs. The windings of the rotor and stator discs are placed on confronting faces, the rotor disc being fitted with magnets or windings on these two faces.

One may also refer to the U.S. Pat. No. 4,514,653 which describes an electric machine of the discoidal type comprising several rotor discs and several associated stators.

The U.S. Pat. No. 5,229,677 as to it describes a motor of the discoidal type for marine propulsion.

These documents show that the known discoidal machines are constructed for a given power. Thus to each power corresponds a particular machine comprising a suitable number of rotor and stator discs. Therefore, the components of the machine and in particular the mechanical parts such as the casing for the protection of the motors should be conceived and manufactured for each machine with a given power.

This does not allow to mass-produce the components of the machine. In addition as from its being ordered, the manufacture of a discoidal machine is relatively long lasting.

SUMMARY OF THE INVENTION

The invention has as its object to cope with these inconveniences by proposing an elementary module for an electric machine of the discoidal type, a machine conceived from such modules and a method of manufacture of such a machine.

An elementary module according to the invention comprises at least one stator sub-assembly, at least one rotor sub-assembly and at least one casing element connected to the stator sub-assembly, the said sub-assemblies being disposed coaxially.

In a particular embodiment, the elementary module comprises a shaft portion, the said sub-assemblies being centred on the axis of the said shaft portion.

In a preferred manner, the casing element of the elementary module comprises a partition wall and/or at least one boss on its internal face for the holding in position of the stator windings.

Moreover, the discoidal machine according to the invention comprises at least one elementary stator/rotor module corresponding to a determined power and end modules comprising each one at least one end flange, the said elementary and end modules being mechanically assembled so that they all be centred on the axis of the machine, the casing elements of each elementary module being connected to each other and to the said end flanges to constitute the casing of the machine.

Each elementary module comprises active portions (magnetic circuit element, electric circuit or magnet element) and a casing element which are conceived for coupling themselves to an adjacent elementary module or an end module.

Thus each end module comprises at least one end flange and possibly an element such as a yoke permitting the return of the magnetic flux.

In effect, the air gap flux may be peculiar to an elementary module. In this case, the rotor or stator end discs of the elementary module exhibit a reluctance permitting the closing of the flux lines of one pole to the following one. This may in particular be obtained by suitable dimensions or by the addition of a yoke.

One may also contemplate that a given air gap flux extends through a limited assembly of modules.

In all cases, each end module comprises one end flange only.

In these first embodiments of the machine, each elementary module or each limited assembly of modules is independent and may be fed independently.

Furthermore, a substantial portion of the air gap flux may extend through the whole assembly of elementary modules of the machine.

In this case, each end module comprises an element permitting the return of the flux. This element assumes the shape in particular of a yoke which is fastened onto a rotor or stator end disc or yet fastened onto the flange and contiguous to a stator end disc.

Thus a substantial portion of the air gap flux closes itself from one pole to the other one of a same end disc through the medium of this yoke.

This latter embodiment of the machine permits to decrease the thicknesses of the discs of each elementary module and thus obtain savings in bulk and in weight.

At last, the end flange of each end module is generally fitted with a bearing permitting the free rotation of the rotor sub-assembly and its centring onto the stator.

The elementary modules may be placed onto a common shaft or comprise shaft portions connected to each other during the assembly of the elementary modules.

The modular architecture of such a machine of discoidal type permits to use identical elements for a given diameter and a given range of power.

This architecture permits to manufacture machines with differing power from standard elementary modules. It therefore permits to reduce both the manufacturing costs and the times of delivery of the machines. In effect the manufacture of these independent modules may be carried out in a mass production. Furthermore, the latter may be available with a view to a final assembling thereby permitting to reduce the time of delivery of the machines.

The following technical characteristics may also be taken into consideration according to all their technically possible combinations:

each stator sub-assembly is connected to the casing of the machine whereas each rotor sub-assembly is connected to for rotation with the shaft of the machine, the shaft of the machine is made in one single piece or consists of shaft portions connected to each elementary module, the length of the shaft being adapted to the number of elementary modules, the windings of the stator sub-assemblies are connected to each other by connectors fastened onto or inside of the casing of the machine and the windings of the rotor sub-assemblies are possibly fastened to the shaft of the machine on or inside of the shaft, the machine comprises an excitation alternator, the alternator is of the discoidal type, the excitation alternator constitutes an elementary module comprising a stator disc centred onto the axis of the machine, connected to the casing and carrying windings, other windings being provided on an elementary rotor/stator module of the said machine, onto one face of the rotor disc opposite the stator disc.

The invention also relates to a method of manufacture of modular electric machines of the discoidal type, comprising:

a mechanical assembling of elementary modules and of end modules comprising at least one end flange so that they all be arranged coaxially on the axis of the machine and an assembling of the casing elements of each elementary module and of the said end flanges to constitute the casing of the machine.

The method may also exhibit the following characteristics taken independently or in combination:

the method consists also in assembling an element permitting the return of the magnetic flux, the elementary modules are assembled on a shaft in one single piece, each elementary module comprises one shaft portion, the assembling of the shaft portions being carried out during the assembling of the modules, the method also consists in assembling an elementary excitation alternator module of the discoidal type with at least one elementary rotor/stator module the rotor sub-assembly or sub-assemblies of which are wire-wound.

BRIEF DESCRIPTION OF THE DRAWINGS

The invention will be better understood and further objects, advantages and characteristics thereof will appear more clearly at the reading of the description which follows, made with reference to the attached drawings showing non-limiting examples of embodiment of the invention and on which.

DETAILED DESCRIPTION OF THE PREFERRED EMBODIMENTS

The elements common to the different figures are designated by the same references.

Figure 1:
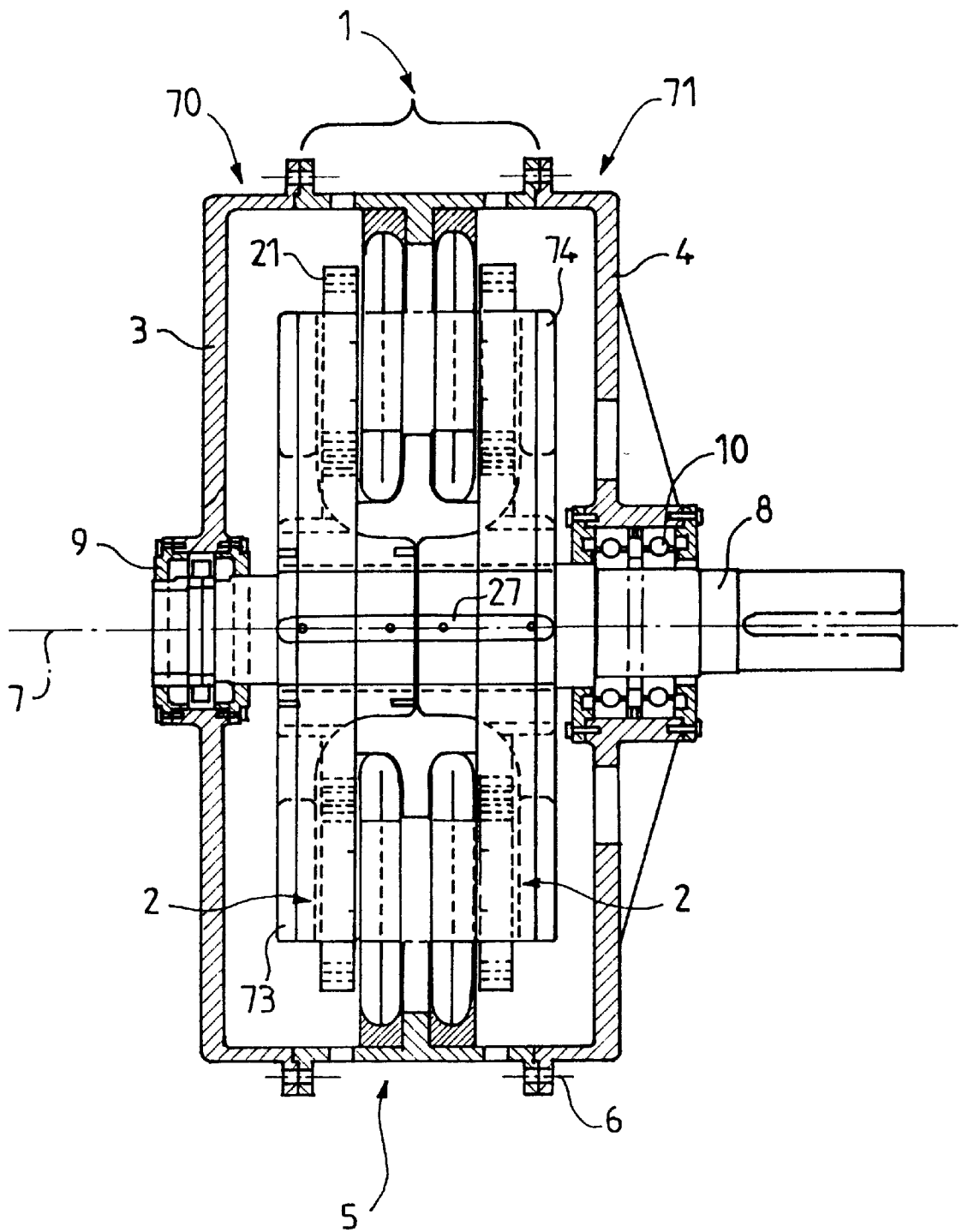
FIG. 1 shows a diagrammatic view in axial section of a first example of embodiment of a machine of the discoidal type according to the invention.
Figure 2:
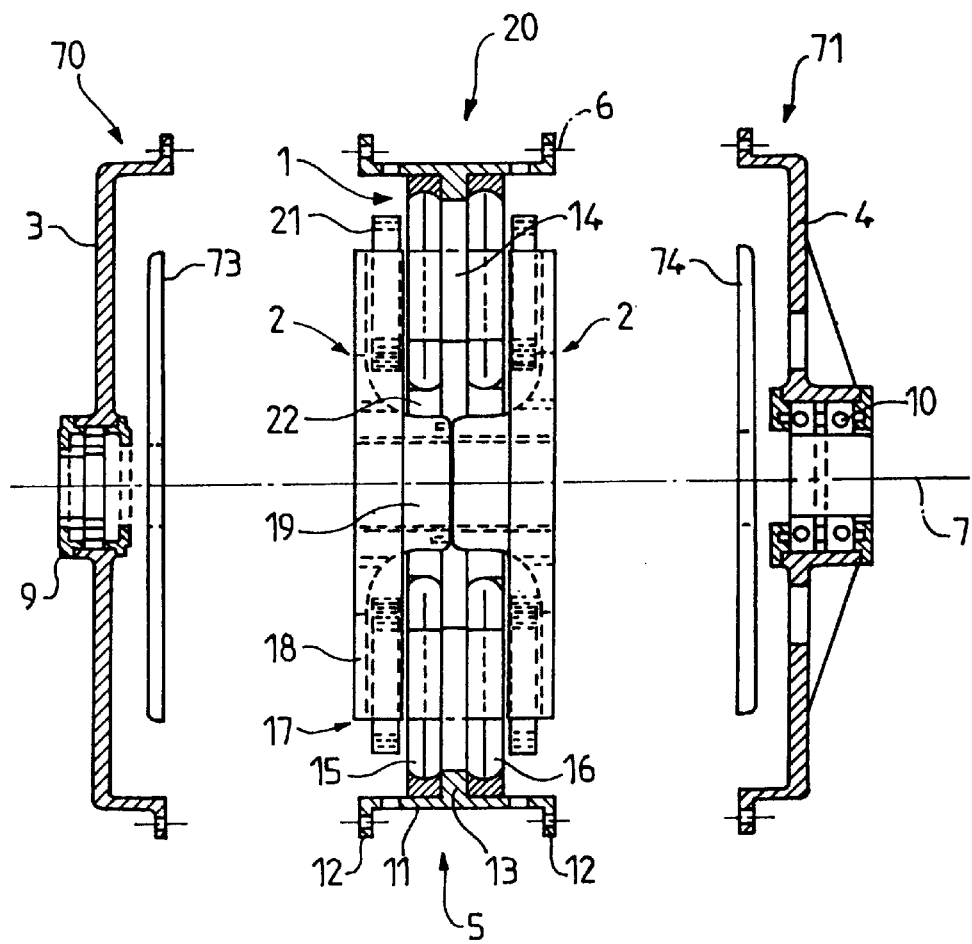
FIG. 2 shows an exploded view of the different components of the machine illustrated on FIG. 1, with a first embodiment of an elementary module according to the invention.

One refers quite at first to FIGS. 1 and 2 which show a diagrammatic view in section of a first exemplary embodiment of a machine of discoidal type according to the invention, the section being made along the axis of the machine.

This machine consists of an elementary rotor/stator module 20, defined for a determined nominal power and of two end modules 70,71.

Each end module 70,71 comprises an end flange 3,4 and a yoke 73,74 in particular in the shape of a ring.

The end flanges ensure the closing of the machine and the mechanical holding of the shaft 8.

In the example illustrated on FIGS. 1 and 2, this module 20 comprises a first sub-assembly 1 constituting the stator of the machine, two sub-assemblies 2 which constitute the rotor thereof and a casing element 5 connected to the stator sub-assembly 1.

In this exemplary embodiment, the end discs are rotor discs onto which are fastened the rotor yokes 73, 74. If the end discs are stator discs, the yokes are stator yokes.

Both end flanges 3 and 4 are fastened to the casing element 5 of the stator sub-assembly I by suitable means which are not illustrated on FIG. 1. These assembly means may in particular be placed along an axis 6 parallel to the axis 7 of the machine.

Each one of the flanges 3,4 supports the shaft 8 of the machine through the medium of ball bearings 9,10.

Both sub-assemblies 2 constituting the rotor of the machine are centred onto the axis 7 of the shaft 8 of the machine.

The casing 5 of the stator sub-assembly 1 comprises an element 11 exhibiting a general cylindrical or polygonal shape.

This element 11 comprises two flanges 12 which are made fast to this element by known means which are not shown on FIG. 2. They may in particular be fastened by means of a weld.

Onto the internal face of the casing element 5, i.e. onto the face opposite to the shaft 8 of the machine, is fastened a partition wall 13 in the shape of a ring. This partition wall 13 may in particular be fastened by welding.

The body 14 of the stator disc comprises a central hollowed-out portion 22 and it is fastened onto the partition wall 13. This fastening may in particular be carried out by means of bolts which are not shown on the figures.

The different components of the magnetic circuit and in particular the assemblies of laminated metal sheets are placed onto the body 14 of the stator according to known techniques. The body 14 also receives the stator windings 15 and 16. The latter are held in position owing to the partition wall 13.

The stators sub-assembly I is centred onto the axis 7 of the shaft 8 of the machine which corresponds also to the axis of rotation of the rotor.

The rotor sub-assembly 2 is disposed opposite each one of the faces of the stator sub-assembly 1, i.e. opposite the windings 15 and 16 of the stator.

Each rotor sub-assembly 2 comprises a disc 17 exhibiting a slab-shaped body 18 and a central hub 19.

The hub 19 is bored so that its internal diameter corresponds substantially to the diameter of the shaft 8 of the machine. Thus, the rotor discs 17 may be connected for rotation to the shaft 8 through the medium of keys 27.

On FIGS. 1 and 2, the rotor discs 17 are fitted with coiled windings 21. The latter are arranged in crown configuration on the surface of the rotor disc opposite the windings 15 and 16 of the stator 1.

The invention also applies to a machine the rotor of which is fitted with permanent magnets also arranged in crown configuration.

It applies also to an asynchronous or direct current machine.

In the case of a rotor of an asynchronous machine fitted with windings, the latter are flown through by a direct current for magnetizing the rotor. For that purpose, one arranges endwise of the shaft of the machine an excitation alternator the output current of which is rectified. Such an alternator will be described subsequently in a more detailed manner with reference to FIG. 6.

Thus, the elementary rotor/stator module of the main machine shown on FIG. 1 is manufactured by assembling the rotor sub-assemblies 2 on either side of the stator sub-assembly 1 which comprises a casing element 5, the sub-assemblies being disposed coaxially.

One provides the machine shown on FIGS. 1 and 2 by fastening the yokes 73,74 onto the rotor discs 17, which yokes ensure the closing of the magnetic flux and by assembling the end flanges 3 and 4 and the casing element 5 of the stator sub-assembly 1. This assembly is carried out through the medium of bolts which are not shown on the figures. These bolts are placed in the flanges 12 and along the axis 6, parallel to the axis 7 of the machine.

In the embodiment illustrated on FIGS. 1 and 2, an end module could comprise one end flange only, the thickness of the stator discs 17 being then selected in a suitable manner.

Figure 3:
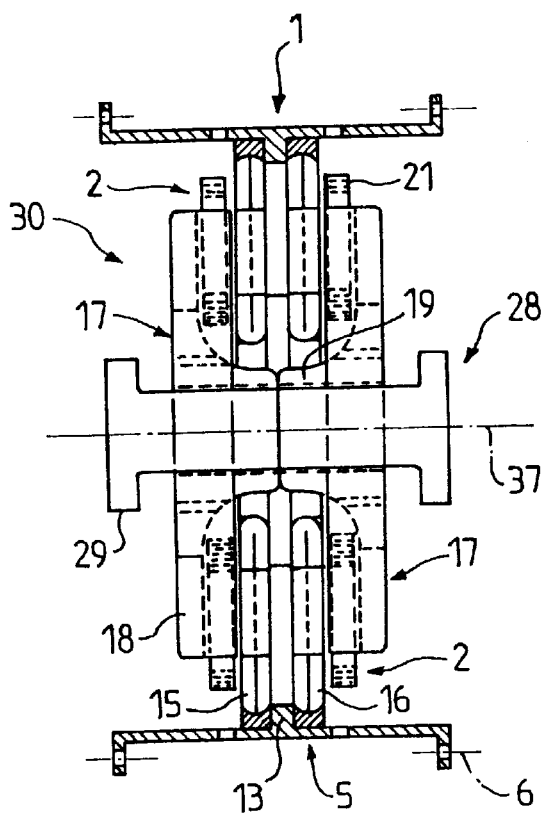
FIG. 3 shows a diagrammatic view in axial section of a second embodiment of an elementary module according to the invention.

FIG. 3 shows a second example of elementary module according to the invention 30 comprising, like the module 20 of FIGS. 1 and 2, a stator sub-assembly 1, two rotor sub-assemblies 2 and a casing element 5 connected to the stator 1.

In this exemplary embodiment, the end discs which are rotor discs 17 are dimensioned in a suitable manner to ensure the closing of the main flux of the machine of which the elementary module forms part.

The end modules of such a machine thus comprise one flange only.

The module 30 also comprises a shaft portion 28.

The elementary module 30 is provided by centring the stator sub-assembly 1 onto the shaft portion 28 and then by assembling the rotor sub-assemblies 2 on either side of the stator sub-assembly 1. The rotor sub-assemblies are also centred onto the axis 37 of the shaft portion.

The shaft portion 28 comprises at each one of its ends a shoulder 29 to permit the assembling of the module 30 with at least another module also comprising a shaft portion.

This shaft portion could exhibit a shape different from that illustrated on FIG. 3.

Figure 4:
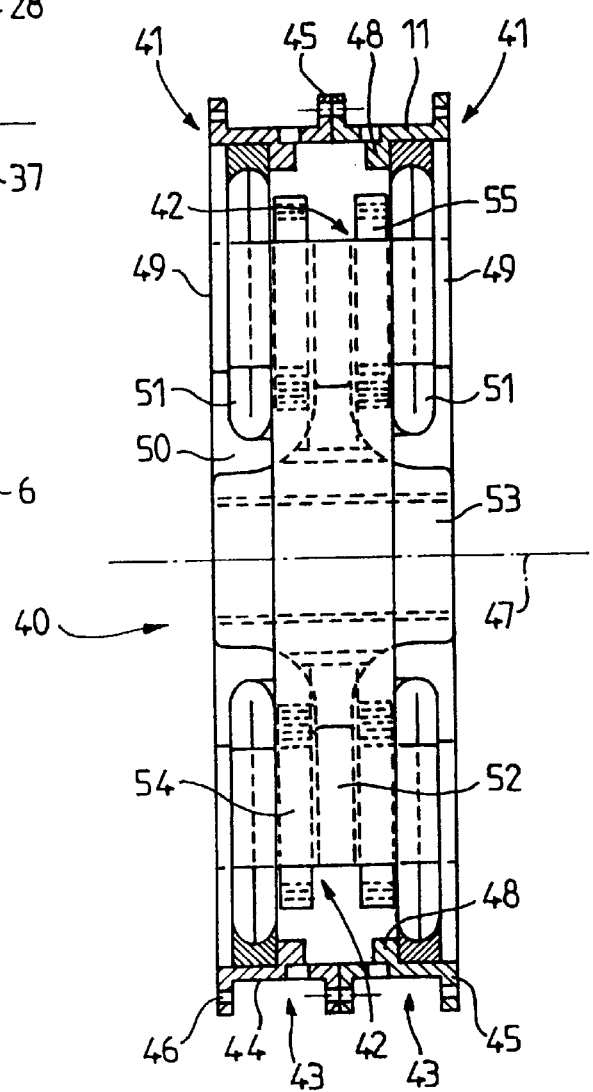
FIG. 4 is a diagrammatic view in axial section of a third embodiment of an elementary module according to the invention.

FIG. 4 shows a third example 40 of elementary module according to the invention comprising two sub-assemblies constituting the stator 41, one sub-assembly constituting the rotor 42 and two casing elements 43 each one associated to one stator sub-assembly 41.

One may also provide one single casing element common to both stator sub-assemblies 41. In this case the central flange 45 is omitted.

The rotor sub-assembly 42 like both stator sub-assemblies 41 is centred onto the axis 47 of the module 40.

The rotor sub-assembly 42 comprises a disc 52 with a central hub 53.

In the example illustrated on FIG. 4, the hub 54 is bored out for the passage of a shaft which is not shown.

The elementary module 40 could also be conceived to comprise a shaft portion like the module 30.

The rotor sub-assembly 42 is fitted on each one of its faces with coiled windings 54 and 55.

One stator sub-assembly 41 is disposed opposite each one of the faces of the rotor sub-assembly 42 and therefore facing each one of the windings 54 and 55.

Each casing element 43 comprises a central portion 44 exhibiting a general cylindrical or polygonal shape and two flanges 45 exhibiting a hollow 46 for the passage of fastening means.

On the internal face of each casing element is preferably provided at least one boss or one partition wall 48 for positioning the stator disc 41.

The body 49 of each stator disc comprises a central hollowed-out portion 50. The casing element 43 may be fastened onto the body 49 by any suitable means.

The body 49 in particular receives the stator windings 51.

Figure 5:
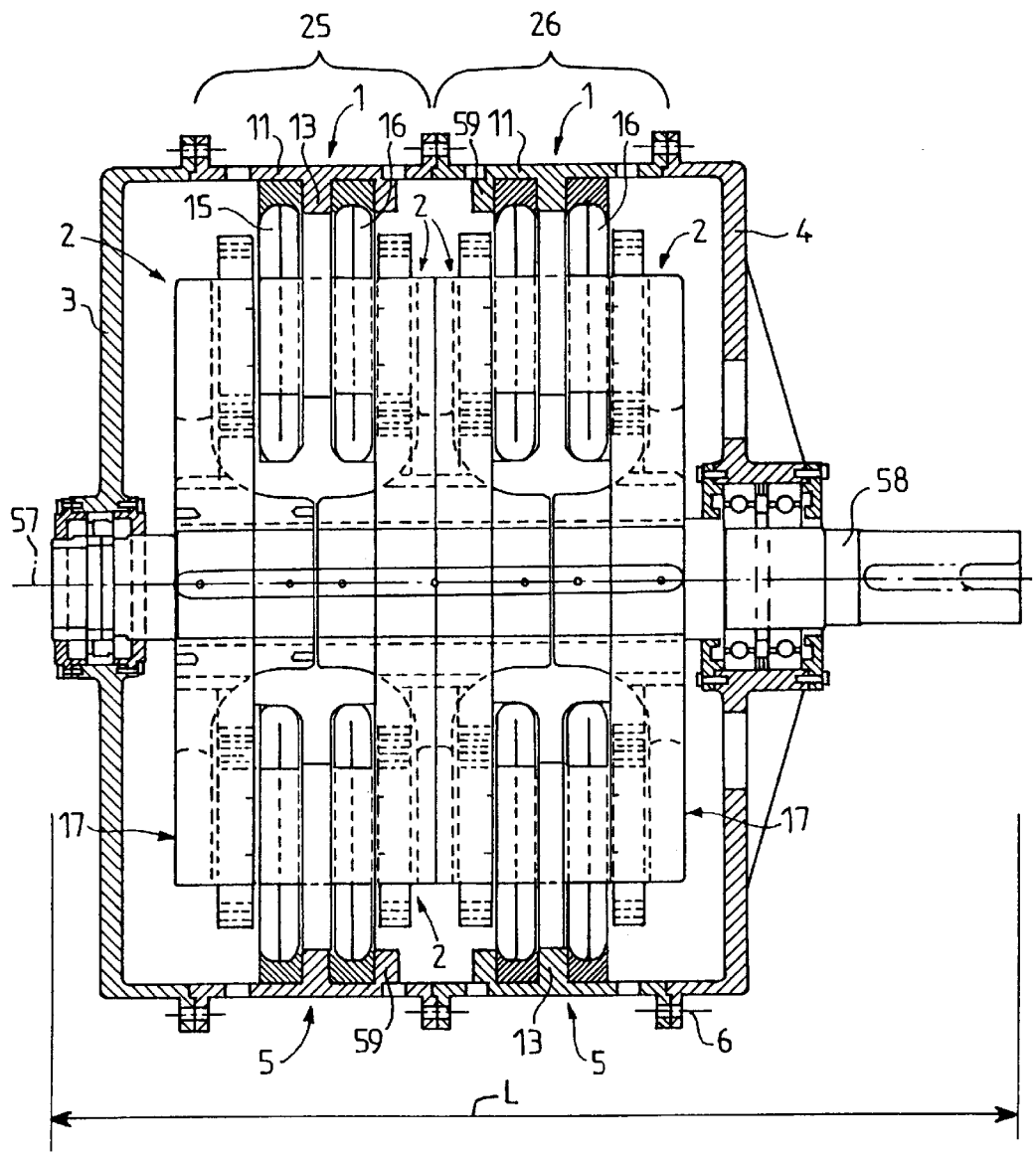
FIG. 5 is a diagrammatic view in axial section of a second exemplary embodiment of a machine of discoidal type according to the invention.

One refers now to FIG. 5 which shows a view in section of a machine according to the invention consisting of two elementary rotor/stator modules 25,26 and of two end flanges 3 and 4.

Each one of these modules 25,26 is of the same type as the module 20 described with reference to FIGS. 1 and 2.

Thus each elementary module 25,26 comprises a stator sub-assembly 1, two rotor sub-assemblies 2 and a casing element 5 connected to the stator sub-assembly 1. All these sub-assemblies are centred onto the axis 57 of the shaft 58 of the machine.

A partition wall 13 is also provided on the internal face of each casing element 5. One could also provide bosses 59 for still better holding in position the windings 15 and 16.

The casing of the whole machine is provided by the assembly of the end flanges 3 and 4 and of the casing elements 5 of each one of the elementary modules 25 and 26. This assembly is in particular carried out by means of bolts which are not shown on FIG. 5. These bolts are arranged along an axis 6 parallel to the axis 57 of the shaft 58 of the machine.

Thus, except for the length L, the dimensions of the machine illustrated on FIG. 5 which comprises two rotor/stator modules 25,26 are identical with those of the machine illustrated on FIGS. 1 and 2 and which comprise one single rotor/stator module 20 only.

In the embodiment illustrated on FIG. 5, the end discs 17 which are rotor discs are dimensioned to ensure the closing of the main flux of the machine.

In the examples of machine illustrated on FIGS. 1, 2 and 5, each elementary module consists of two rotor sub-assemblies, of one stator sub-assembly and of one casing element.

The invention is however not limited to this type of machine. A discoidal machine according to the invention may also be provided from elementary modules consisting of one rotor sub-assembly and one stator sub-assembly or also of one rotor sub-assembly placed between two stator sub-assemblies like the module 40 illustrated on FIG. 4.

Moreover the machine may be provided from elementary modules comprising a central bore for the passage of the shaft of the machine like the modules illustrated on FIGS. 1, 2 and 4 or also from elementary modules comprising each one a shaft portion like the module illustrated on FIG. 3.

In a general manner the length of the shaft of the machine is at least equal to the sum of the thicknesses of each elementary module constituting the machine.

Figure 6:
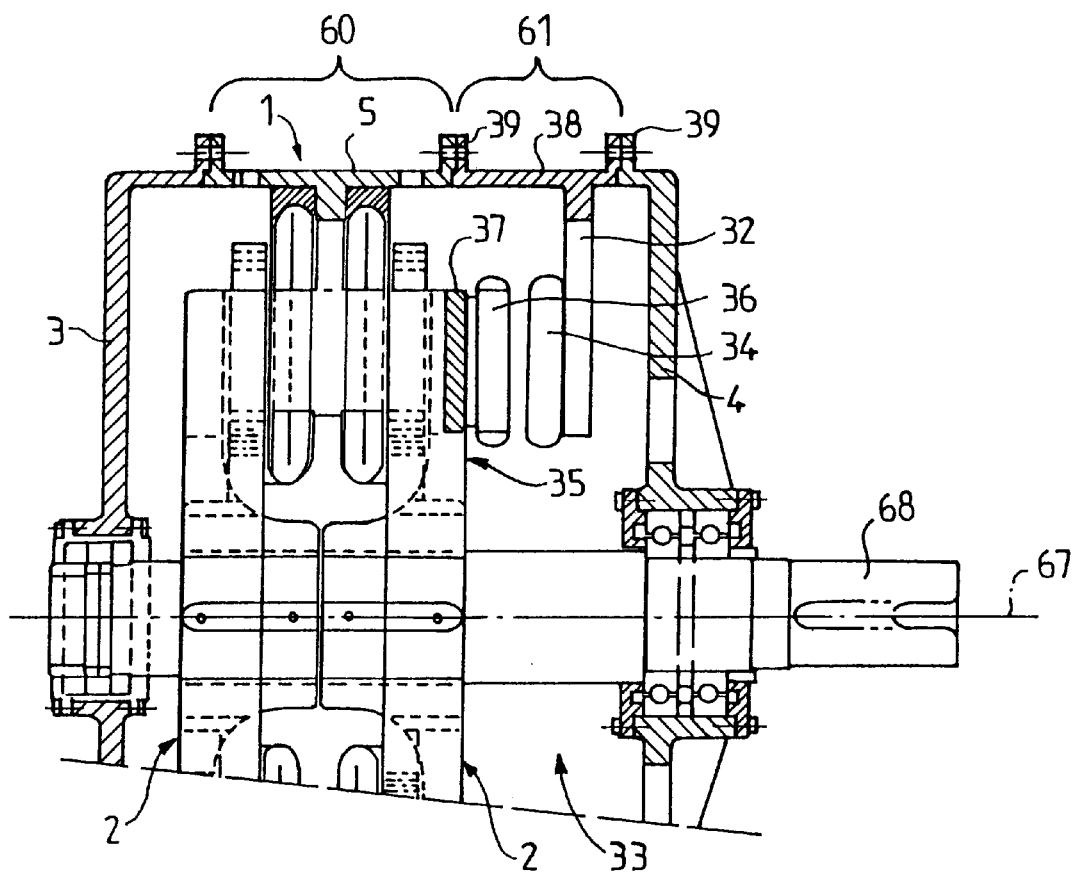
FIG. 6 is a diagrammatic view of a machine according to the invention comprising an excitation alternator, the said view being in partial section along the axis of the machine.

One now refers to FIG. 6 which shows a partial section of a machine according to the invention comprising an excitation alternator.

As stated previously, in the case of a machine with a wire-wound rotor, the rotor is magnetized by feeding its windings with a direct current. It is an excitation alternator the output current of which is rectified which produces this feed current.

One recognizes on FIG. 6 a rotor/stator module 60 such as those described with reference to FIG. 5.

As in the examples described previously, this rotor/stator module 60 is composed of one stator sub-assembly 1 and of two rotor sub-assemblies 2. One should refer to the foregoing figures for a detailed description of these sub-assemblies. However other types of elementary module could be contemplated and the invention is not limited to this example.

The machine illustrated on FIG. 6 moreover comprises another rotor/stator module 61 which is specific to the excitation alternator.

The excitation alternator is also of discoidal concept. It comprises a magnetic stator disc 32 which exhibits a central hollowed-out portion 33.

The disc 32 is centred on the axis 67 of the shaft 68 of the machine.

The stator disc 32 comprises on its face opposite the rotor/stator module 60, windings 34. The latter are fed with direct current by an outside source not shown on FIG. 6.

The rotor of the module 61 is constituted by windings 36 which are placed on the free face of the rotor sub-assembly 2 of the rotor/stator module 60, this rotor sub-assembly 2 facing the stator 32 of the alternator module 61.

The windings 36 are thus disposed on one face 35 of the rotor disc opposite the stator disc 32.

These windings 36 generate an alternative electromotive force which is rectified by a diode bridge 37 installed for example onto the rotor sub-assembly 2 which carries the windings 36.

One may also provide protection fuses.

In this embodiment, the diodes are lying near the excitation circuit of the rotor/stator module 60 of the machine, thereby permitting to use very short connections. In addition this arrangement promotes the mechanical protection of the diodes.

The magnetic stator disc 32 of the alternator module 61 is connected to one casing element 38 which comprises fastening flanges 39.

It is through the medium of these fastening flanges 39 that the stator disc 32 is connected to the rotor/stator module 60 as well as to one of end flanges 4 of the machine.

Thus, the casing of the machine is provided by the assembling of the flanges 3 and 4 and of the casing elements 5 and 38 of the rotor/stator modules 60 and alternator 61.

The excitation alternator used in one discoidal machine according to the invention is not necessarily of the discoidal type like the one which has just been described. One may also provide a conventional alternator.

As stated previously, the machine illustrated on FIG. 3 comprises two modules such as the one illustrated on FIG. 2 and therefore has a power twice as great as that of the machine shown on FIG. 1.

For example, if the elementary module 20 shown on FIG. 2 may supply a power of 100 kW at 500 r.p.m. under a feed voltage of 1,000 V and a current of 70 A, the machine illustrated on FIG. 3 comprising two modules of this type may suply a power of 200 kW at 500 r.p.m.

This machine could be fed under 1,000 V and 140 A or 2,000 V and 70 A according as the coupling of the windings of the stator discs of the machine is made in series or in parallel.

Likewise a machine comprising three elementary modules of this type may supply a power of 300 kW at 500 r.p.m.

Thus with a determined power range and machine diameter, the power of the machine may be adjusted by assembling a suitable number of elementary rotor/stator modules of any type whatsoever.

This modular architecture may be applied to any machine type: with direct current, synchronous or asynchronous, with a wire-wound rotor or with permanent magnets.

These standard elementary modules are manufactured from rotor or stator sub-assemblies which may be mass-produced. This manufacture may be partially or totally automatized thereby decreasing the costs.

The elementary modules exhibit a transverse axis of symmetry so as to optimize the standardisation of the component sub-assemblies.

Furthermore the common shafts made in one single piece may be mass-produced. They exhibit a length corresponding to a given number of modules depending on the power desired for the machine.

If the machine should comprise an excitation alternator, the latter may be make the subject of a specific module but provided from elements similar to those of a standard rotor/stator module.

An elementary module may also include a feed source (a converter for example or also a cell for the protection and connection to electric supply mains). The supply source may consist of several devices grouped inside of the elementary module. Each module is capable of an individualized feeding to improve the performances of the machine into which it is integrated.

The windings of stator discs are independent and they may be connected according to the desired configuration. The electric connection of the windings of the stators to each other is made by connectors fastened onto or inside of the casing of the machine. The windings of the rotor sub-assemblies are possibly fastened to the shaft of the machine onto or inside thereof.

In all the exemplary embodiments described previously, the shaft of the machine is driven for rotation and the casing is stationary.

The invention may also apply to a machine of which the shaft is stationary and the casing rotates. One may also refer in this respect to the French patent application No 95 153 03 the content of which is included by way of reference.

The reference signs inserted after the technical characteristics mentioned in the claims have the sole purpose of improving the understanding of the latter and may not limit the scope.

We claim:

1. An independent elementary module for a discoidal machine comprising:
   a tubular casing having opposed first and second open sides;
   a stator sub-assembly comprising a stator disc located inside, fixedly mounted to, and supported by the tubular casing; and
   a rotor sub-assembly comprising a rotor disc for rotating relative to said stator disc, wherein the stator and rotor sub-assemblies are disposed coaxially with respect to each other inside the tubular casing, the tubular casing including means for coaxial attachment at the first and second open sides to tubular casings of additional elementary modules and to covering flanges covering the open sides, without contacting the stator and rotor sub-assemblies in an adjacent tubular casing.

2. The independent elementary module according to claim 1, comprising a shaft coaxial with the tubular casing and the stator and rotor sub-assemblies.

3. The independent elementary module according to claim 1 wherein the tubular casing element comprises one of a partition wall and a boss on an internal face for holding windings of the stator in position.

4. A discoidal electric machine comprising:
   at least two independent elementary modules, each independent elementary module including:
   a tubular casing having first and second open sides, a stator sub-assembly comprising a stator disc located inside, fixedly mounted to, and supported by the tubular casing, and
   a rotor sub-assembly comprising a rotor disc for rotating relative to the stator, wherein the rotor and stator sub-assemblies are disposed coaxially with respect to each other inside the tubular casing, the tubular casings of the at least two independent elementary modules being coaxially joined at respective open sides;
   a shaft coaxial with the independent elementary modules and the stator and rotor sub-assemblies of the independent elementary modules and attached to the rotor discs; and
   two end modules, each of the two end modules comprising a flange closing an open side of one of the casings without contacting the stator and rotor sub-assemblies, and forming a complete housing of the electric machine.

5. The discoidal electric machine according to claim 4, wherein the end modules comprise an element permitting return of magnetic flux.

6. The discoidal electric machine according to claim 4, wherein the shaft includes a plurality of shaft portions, each shaft portion being connected to an elementary module, the length of the shaft being determined by the number of elementary modules coaxially joined.

7. The discoidal electric machine according to claim 4 wherein the stator sub-assemblies further comprise windings connected to each other by connectors fastened to the complete housing of the electric machine.

8. The discoidal electric machine according to claim 4 wherein the rotor sub-assemblies further comprise windings fastened to the shaft of the electric machine.

9. The discoidal electric machine according to one of claim 4, wherein the electric machine comprises an excitation alternator.

10. The discoidal electric machine according to claim 9, wherein the stator disc carries windings and the rotor disc carries windings opposite the stator disc.

11. A method of manufacturing an electric machine comprising:
    mechanically assembling at least two independent elementary modules together, wherein each of the independent elementary modules includes:
    a tubular casing having first and second open ends,
    a stator sub-assembly comprising a stator disc located inside, fixedly mounted to, and entirely supported by the tubular casing, and
    a rotor sub-assembly comprising a rotor disc for rotating relative to the stator, wherein the rotor and stator sub-assemblies are disposed coaxially with respect to each other, inside the tubular casing, so the tubular casings of the at least two independent elementary modules are joined coaxially at respective open sides; and
    attaching end modules comprising end flanges to open sides of the joined tubular casings as a complete housing of the electric machine.

12. The method according to claim 11, including assembling the independent elementary modules on a unitary shaft.

13. The method according to claim 11, wherein each independent elementary module comprises a shaft portion, including assembling the shaft portions while assembling the independent elementary modules.

14. The method according to claim 11 comprising assembling an elementary excitation alternator module, the rotor sub-assembly including a wire-wound coil.

* * * * *